Figure 1:
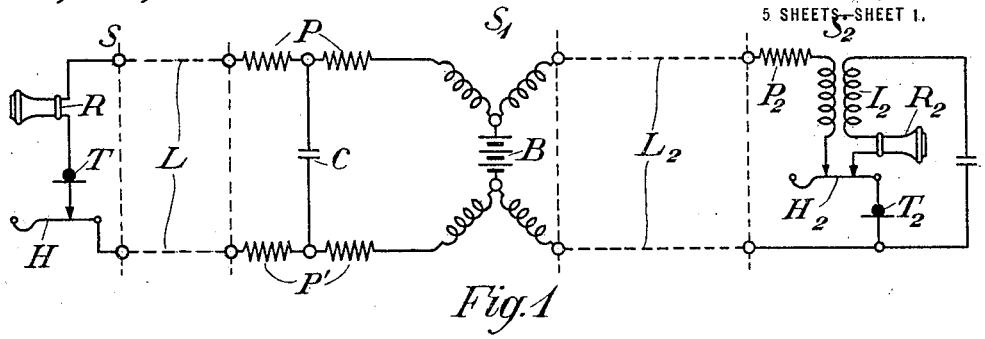

B. GHERARDI.
SYSTEM FOR THE EQUALIZATION OF TRANSMISSION LINES.
APPLICATION FILED DEC. 27, 1917.

1,396,930.

Patented Nov. 15, 1921.

INVENTOR.
B. Gherardi
BY
ATTORNEY

B. GHERARDI.
SYSTEM FOR THE EQUALIZATION OF TRANSMISSION LINES.
APPLICATION FILED DEC. 27, 1917.

1,396,930.

Patented Nov. 15, 1921.
5 SHEETS—SHEET 5.

INVENTOR.
B. Gherardi
BY
ATTORNEY

UNITED STATES PATENT OFFICE.

BANCROFT GHERARDI, OF BAYHEAD, NEW JERSEY, ASSIGNOR TO AMERICAN TELEPHONE AND TELEGRAPH COMPANY, A CORPORATION OF NEW YORK.

SYSTEM FOR THE EQUALIZATION OF TRANSMISSION-LINES.

1,396,930.     Specification of Letters Patent.     Patented Nov. 15, 1921.

Application filed December 27, 1917. Serial No. 209,116.

*To all whom it may concern:*

Be it known that I, BANCROFT GHERARDI, residing at Bayhead, in the county of Ocean and State of New Jersey, have invented certain Improvements in Systems for the Equalization of Transmission-Lines, of which the following is a specification.

This invention relates to telephone systems and more particularly to the provision of means whereby the electrical characteristics of telephone lines may be equalized or rendered more uniform.

Telephone lines have, in general, different electrical characteristics varying with the lengths of the lines. For any particular type of line construction which may be employed the resistance, capacity, inductance and leakage of the circuit increase with the length. These variations in the electrical characteristics of the different subscribers' lines in a telephone system introduce a number of variable effects in the telephone service rendered from different stations. For example the different electrical characteristics result in different degrees of attenuation in the alternating telephone current passing over the subscribers' lines and thus give louder and more effective telephonic communication to subscribers connected by means of short lines than to subscribers connected by means of long lines. As a result, a subscriber having a long line, when connected with any other subscriber, does not receive as good telephone transmission as would a subscriber having a short line similarly connected. Furthermore, in the common battery systems now so generally employed in all but small communities, the resistance of the line causes a further effect on the transmission in that it reduces the amount of direct current which the transmitter receives from the central office battery and so renders it less efficient in the generation of the alternating telephone current. Likewise in common battery systems employing electro-magnetic receivers,—*i. e.* receivers not including a permanent magnet but depending for their energization upon the supply current,—this variation in current supply introduces changes in the efficiency of the receiver. A further loss in transmission occurs if the impedance of the subscriber's line differs from the impedance of the terminal or circuit to which it is connected, and therefore this loss, which is known as a reflection loss, varies as the impedance of the line varies.

Where an anti-side tone type of substation circuit is associated with the transmission line, it is necessary to balance said line, of which the subscribers' line is an important part, by an artificial line. Difficulties in obtaining a uniform anti side tone arrangement are increased by the variations in the electrical characteristics of the subscribers' lines. These variations also affect the design of trunks and toll lines. When two subscribers located in different central offices are connected to each other by means of trunks or toll lines, it has been necessary to design such trunks or toll lines so as to obtain the efficiency necessary to give satisfactory service to the subscribers having the longest subscribers' lines, thus requiring greatly increased expenditure over and above what would have been needed had the transmission efficiency of the long subscribers' lines been equal to that of the short ones.

Attempts have been made heretofore to overcome certain of these difficulties by reducing to some extent the direct current supply for short or low resistance subscribers' lines. These methods were defective not only because they did not render the current supply constant for lines of different resistances but for the further reason that no attempt was made to equalize the electrical characteristics for alternating telephone current thereby failing to consider the other serious difficulties mentioned above. The present invention has for its object the substantial elimination of the difficulties above mentioned, together with the accomplishment of other ends more fully appearing hereafter. These objects are attained in accordance with the present invention by the provision of means whereby within any desired limits substantially uniform electrical characteristics may be secured regardless of the length of the subscribers' lines.

While the means for obtaining these uniform electrical characteristics and thus obtaining uniform transmission may within the scope of this invention assume a wide range of forms, it has been found that satisfactory results may be secured by connecting at some point in the transmission circuit impedance elements whose values depend upon the length and electrical characteristics of the subscriber's line. These impedance elements may be arranged in a number of ways depending upon the degree of equalization of the different characteristics which it is desired to obtain. Combinations of series and shunt impedance elements so chosen as to simulate the electrical constants of different lengths of the subscriber's line can be used to make all the subscribers' lines have practically the same electrical characteristics. For the type of subscriber's line in general use the leakage and inductance are small and a very close approximation of all the characteristics of a length of line can be obtained with a combination of series resistances and shunt capacities. It has been found in many cases that satisfactory results in the equalization of transmission can be secured by merely inserting at some point in the subscriber's line series impedance elements whose values depend upon the length and electrical characteristics of the line. Certain of the above results may also be secured by using shunt impedance elements. They may also be secured by varying the design and characteristics of the induction coil forming a part of the subscriber's telephone set.

One of the great advantages of the system described above is simplification in the conditions under which the transmitter and the electromagnetic receiver must be operated. Since the exciting current of the transmitter is kept practically uniform independent of the length of the line on which the transmitter is used, it will be possible to design the transmitter for use with reference to this current, and since this current will be low as well as uniform the transmitter may be designed to give a much greater efficiency than would be possible with the same current if the transmitter were required to operate with wide variations in current values. Similarly, the conditions are simplified for electromagnetic receivers. As a result not only will the transmission over lines of different lengths be rendered substantially uniform but the average transmission will be better than that now obtained. In fact, it is possible, by the proper design of the transmitter and receiver, or by increasing the battery voltage at the central office, or by other well known means, when employed in connection with the equalization of the lines as above pointed out, to obtain by this invention over subscribers' lines of any reasonable length transmission which is as good or better than that now obtained on very short lines. The equalization of transmission in accordance with this invention does not involve reducing the transmission over short lines to that secured over the longest line, since it is possible by well known means to increase the transmission to whatever extent may be desired.

The elimination of the variation in efficiency of subscribers' lines and the substation equipment associated therewith renders possible a substantial increase in the transmission efficiency of the telephone system. The telephone switchboards and telephone lines, particularly the trunk lines and toll lines, cannot have impressed upon them energy beyond a certain amount without bringing in difficulties from crosstalk. Similarly the increase in sensitiveness of the receiver is limited by the crosstalk and noises caused by extraneous electrical sources known as inductive disturbances which could be made audible by a very sensitive receiver. By the use of equalized subscribers' lines, it is possible to work the switchboards, trunks and toll lines up to the permissible limit on all connections, whereas without this invention the limit would be fixed by the difficulties encountered in connection with the shorter subscribers' lines.

Furthermore, at the present time all transmitters and receivers must be designed with due regard to the connecting together of two short subscribers' lines without intermediate trunk or toll line. These instruments cannot be made more powerful and more sensitive than would be practical for use under such conditions, thus determining the limit for short lines and placing the longer lines substantially below that limit. This difficulty is overcome by means of the arrangements of this invention.

Another advantage may be cited for the forms of this invention that employ series impedances. In common battery systems the current going out on the subscriber's line is employed to operate relays at the central office for various purposes. The relays employed must be designed so that they will operate satisfactorily at one minute on a short line taking a great deal of current and at the next minute on a long line having only a very small current. This imposes serious limitations on the design of the relays and increases the difficulty in maintaining them in satisfactory operating adjustment. When the lines are equalized in accordance with this invention these difficulties are materially reduced.

Figure 11:
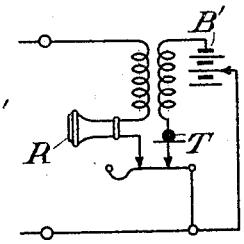
Figure 12:
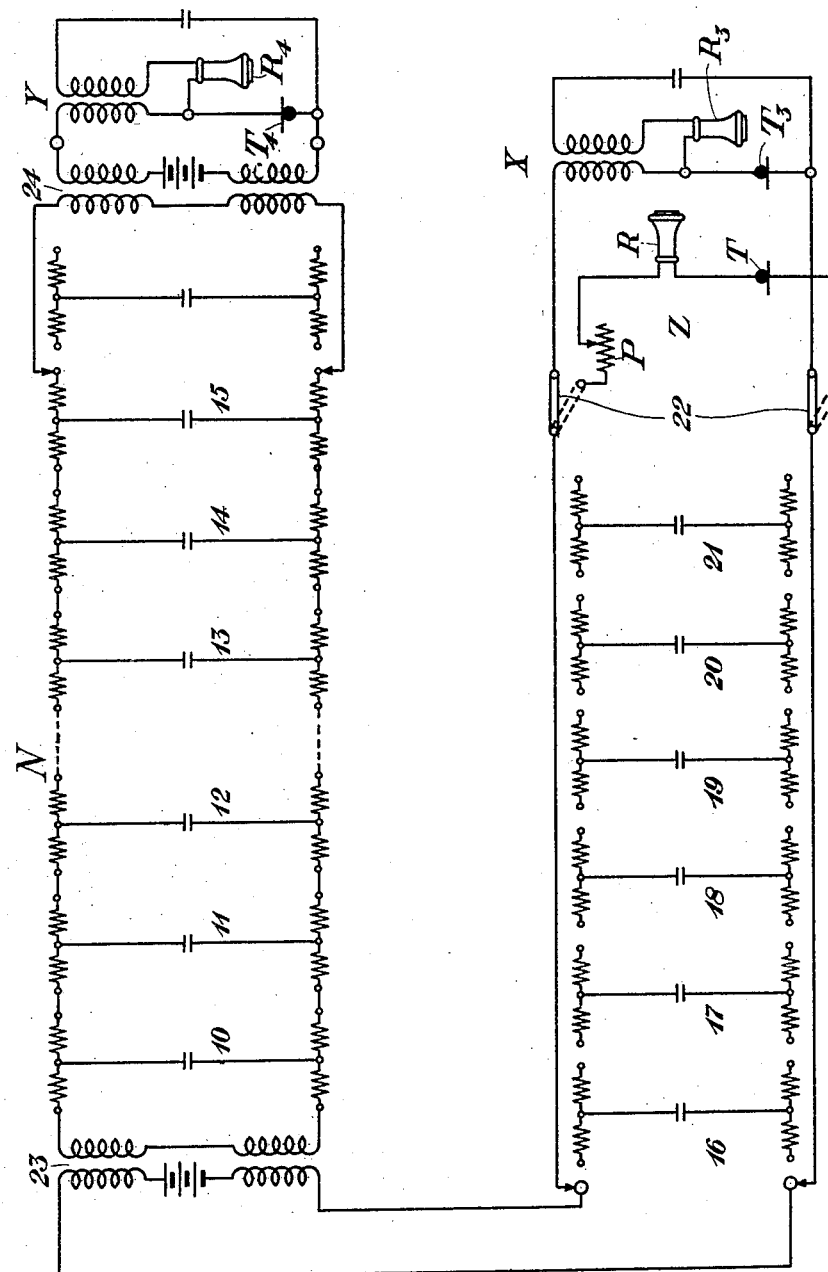

The invention will now be clear from the following description when read in connection with the accompanying drawings, in which Figure 1 is a simplified diagram of a transmission circuit involving two subscribers in the same central office and employing the arrangements of the invention; Figs. 2–11 inclusive are diagrams of substation circuits illustrating different forms of the invention; Fig. 12 is a diagram of a testing circuit whereby the transmission equivalent of the various circuits may be determined; and Figs. 13–18 inclusive are curves illustrating various features of the invention.

Referring to Fig. 1, a transmission circuit is shown in simplified form connecting substations S and $S_2$ through a central station $S_1$. A battery B is provided at the central station from which direct current is supplied over the lines L and $L_2$ to the substations at S and $S_2$ respectively. The substation arrangement at $S_2$ comprises the usual transmitter $T_2$ and permanent magnet receiver $R_2$, the latter being arranged in a local circuit inductively related to the line circuit through an induction coil $I_2$ in the usual manner. The substation circuit at station S comprises a transmitter T and an electro-magnetic receiver R, the two elements being for the purpose of illustration arranged in a simple series circuit in order that the receiver may be energized by the direct current flowing over the line L, although it will be understood that any substation arrangement may be employed in which the direct current flows through the receiver. The two different forms of substations are shown in Fig. 1 for the purpose of illustrating two different forms of the invention, it being understood that the line may terminate in any desired type of substation circuit. The lines leading to various substations in accordance with the present practice vary in length and resistance so that the current supply flowing over the lines from a common central energy source such as B will vary with the electrical characteristics of the line, a greater amount of current flowing over the lines of low resistance. Furthermore the amplitude of the alternating talking currents will vary with the length and resistance of the line aside from the variations in current supply. This results in a corresponding variation in the telephone transmission over the lines.

These factors as well as other considerations already discussed render it desirable that the lines be equalized with regard to their electrical characteristics. This result may be accomplished in various ways and as indicated in Fig. 1 the line L is equalized by inserting in the line an impedance element comprising series resistances P and P' and shunt capacity C. The network thus formed is substantially equivalent to a definite length of line of the type of line L so that the line L and the network together constitutes a conducting system whose electrical characteristics are substantially equivalent to the characteristics of a longer line whose length is the standard for equalization. The network may be inserted in the line at any point but as shown is inserted at the central station $S_1$.

A sufficient approximation of the desired result may in some cases be attained by a simpler form of impedance element. Thus the line $L_2$ is shown as being equalized by a simple series impedance $P_2$ inserted in the line at the substation $S_2$ and which may be of any desired character but preferably is an element, either inductive or non-inductive, whose principal characteristic is its resistance. While conventionally shown as a separate element it is obvious that the impedance may be incorporated in existing elements of the circuit. Thus instead of a separate impedance $P_2$ the winding of the induction coil $I_2$ may be so wound as to provide the necessary impedance. Switch hooks H and $H_2$ may be provided at the stations S and $S_2$ in order to control the circuits of the impedances and substation apparatus.

By properly proportioning these impedance elements as hereinafter more fully explained, the transmission over the lines L and $L_2$ will be substantially equal regardless of their normal resistance. Where a series impedance or resistance element is employed, as in Fig. 1, the inserted impedance will be greatest for short lines and will be gradually decreased with increasing length of line until for lines of a given length no impedance whatever will be inserted. By this arrangement not only will the attenuation of the voice currents be substantially the same for all lines which are equalized, but the direct current supplied to the substation will be substantially the same for all equalized lines and the transmitters in substation circuits of the type shown at S and $S_2$ will in all cases receive substantially the same energizing current. As this current will be no greater than that received over the longest line equalized, it is possible to design the transmitter so as to have a greater efficiency for small currents, since there is no danger that the transmitter will be subjected to large currents which will cause it to "burn". Consequently the insertion of impedance elements in short lines does not necessarily result in reducing the transmission over all lines to that obtained over the longest lines, as it is possible by increasing the efficiency of the transmitter to increase the transmission obtained over all lines above that heretofore obtained over short lines. The uniform current supply obtained also simplifies the conditions for the use of an electromagnetic receiver as shown at station S. One of the difficulties in connection with the use of this type of receiver has been that its efficiency varies with the electrical characteristics of the line, a difficulty which no longer obtains in accordance with the present invention. In addition to the use of a more efficient transmitter and receiver, it is possible to increase the uniform transmission obtainable in accordance with the equalization methods above described, by increasing the potential of the battery at the central station, or by other well known means, so that within reasonable limits any desired transmission may be obtained over any line.

Figure 2:
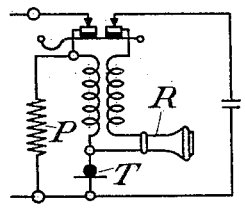
Figure 3:
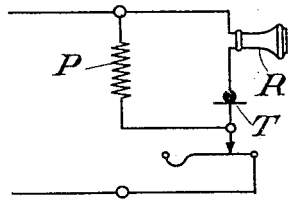

Satisfactory results may in some cases be obtained by shunting the impedance element across the line as shown in Figs. 2 and 3. By locating the impedance shunt at the substation, the direct current supply flowing over lines of different lengths varies somewhat, but the currents flowing through the substations proper may be made equal, regardless of the character of the lines if the impedance shunts be properly proportioned. The impedance employed may be either inductive or non-inductive as desired. The impedance shunt P may be connected across the terminals of a substation employing either a permanent magnet receiver or an electromagnetic receiver, the former arrangement being illustrated in Fig. 2 and the latter in Fig. 3.

Figure 4:
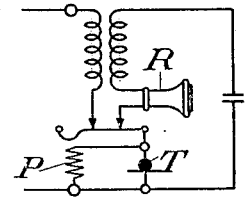
Figure 5:
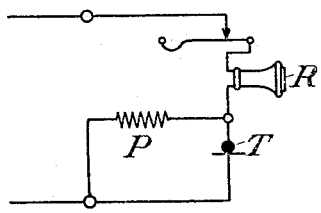

It is not necessary in all cases to shunt the entire substation, it being sufficient to provide a shunt about some element thereof. In Fig. 4 is shown a substation circuit employing a permanent magnet receiver with an impedance element P in shunt of the transmitter T. By properly proportioning the impedance P in accordance with the resistance of the line, the transmitter currents for all lines may be made equal regardless of the current actually flowing in the lines, although the receiving efficiency may vary somewhat. Fig. 5 shows the same arrangement applied to the transmitter of a substation circuit employing an electromagnetic receiver.

Figure 6:
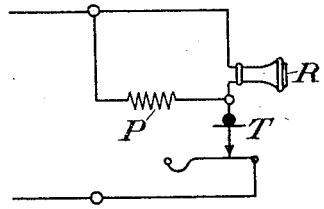
Figure 7:
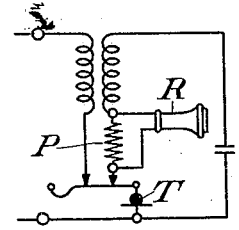
Figure 8:
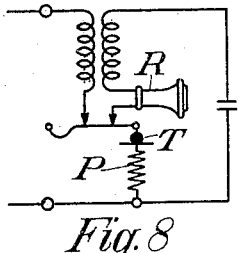

A somewhat similar result may be obtained by shunting the receiver R instead of the transmitter as shown in Figs. 6 and 7. In Fig. 6 the shunt is connected across the terminals of an electromagnetic receiver R, while in Fig. 7 it is connected across the terminals of a permanent magnet receiver. Instead of shunting the transmitter or receiver, it is possible in some types of substation circuit to include an impedance in series with some element of the substation such as the transmitter or receiver. Thus in Fig. 8 for example an impedance P is included in series with the transmitter T for the purpose of equalizing the transmission.

Figures 9, 10:
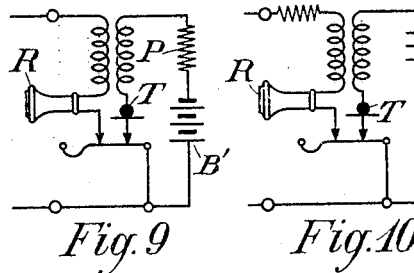

While in general there is greater reason for equalizing the transmission over lines supplied with current from a common central energy source than would be the case with lines employing local battery sets, even in the latter case it may be desirable to equalize the transmission. An arrangement for producing this result is shown in Fig. 9, in which an impedance element P, either inductive or non-inductive, is included in the local circuit comprising the battery B and the transmitter T. By suitably proportioning the impedance element P the energy transmitted over lines of different lengths may be made the same. Instead of inserting the impedance in the local circuit it may be included in the line circuit as shown in Fig. 10. In either case the impedance element may be incorporated in the induction coil. A similar effect may be obtained by eliminating one or more cells of the local battery as indicated in Fig. 11.

Figure 13:
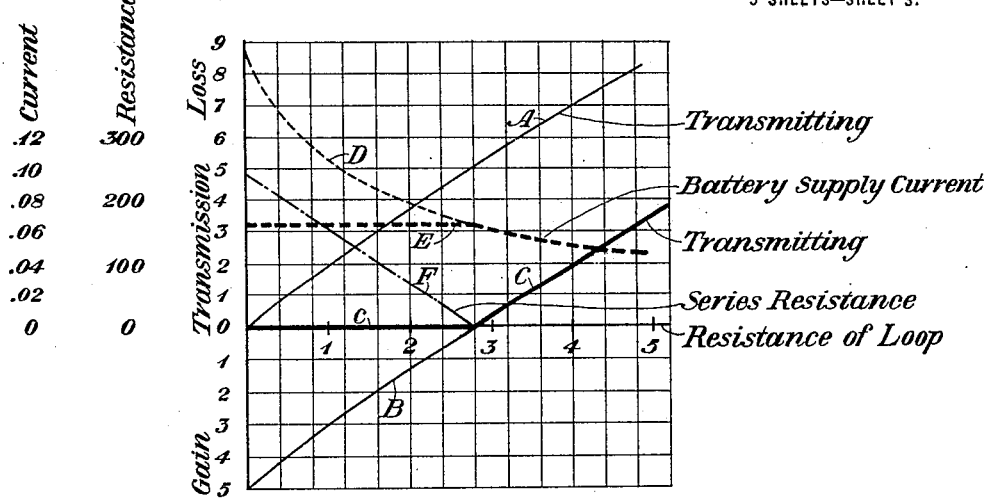

In order to understand more fully how the transmission varies with lines of different electrical characteristics and how to proportion the impedance elements in order to equalize transmission, attention is called to the curves shown in Figs. 13 to 18 inclusive. Referring more particularly to Fig. 13, the curve A is a transmission curve indicating the variation in transmission of a well known type of substation set with lines of different resistance, the loop resistances being plotted as abscissæ and the transmission efficiency being plotted as ordinates.

The manner in which a curve such as A is obtained may be understood by reference to Fig. 12 in which two substation circuits, X and Y, are connected to a zero loop, including one winding of a transformer coil and a battery whose potential is equal to that of the usual central energy source. The substation X, whose transmission is to be measured, is first directly connected to the primary of a transformer 23. The transformer 23 is associated with the transformer 24 of the circuit Y through a variable length of cable, either real or artificial. As shown an artificial cable N is used, said cable being preferably made up of sections such as 10, 11, 12, 13, 14, 15, etc., each section comprising series impedance and shunt capacity of such values that a section is equivalent to a unit length of standard cable. The number of sections employed in the artificial cable N should be sufficient to produce a cable which will still be electrically long when the greatest number of sections is cut out in making the tests hereinafter described. The secondary of the transformer 24 may be adjustably connected to the artificial cable N so that the number of sections included may be varied.

Assuming now that a transmission test is to be made of transmitter $T_3$ of the substation circuit X, the substation X is first directly connected over the switch 22 to the transformer 23, and any desired number of the sections of the artificial cable N are included in the circuit. The transmitter $T_3$ is actuated by a sound and the resultant sound produced by the receiver $R_4$ of the station Y is observed. The sound thus obtained is then considered the measure of the transmission obtained when the substation X is connected to a zero loop. The substation X is then connected with the transformer 23 through a section of real cable of the type with which the substation is to be used, or through one section, say 16, of an artificial cable, said section being made to simulate a unit length of the real cable. The transmitter $T_3$ is again actuated by a sound of the same volume as before and the observer at Y varies the connection of the transformer 24 to the standard artificial cable N cutting out a sufficient number of sections so that the same volume of sound is heard in the receiver $R_4$ as before. When the same volume of sound is obtained, the transmission loss due to the inclusion of one unit, say 16, of the cable to be tested in circuit with the substation X, is equal to the loss which would have been obtained by introducing the number of sections cut out of the artificial cable N instead. In other words the introduction of a unit of the cable $N_1$ produces a transmission loss equal to the introduction of a certain number of units of the standard cable N. Succeeding tests are now made by successively including in circuit with the substation X additional units of the cable $N_1$ and noting the number of sections of the cable N which must be eliminated in order to get the same volume of sound in the receiver $R_4$ in each case. If then the resistances of the number of units of the cable $N_1$ be plotted as abscissæ and the corresponding number of units of the cable N be plotted as ordinates, curve A will result. This curve may be taken as the curve of a standard transmitter $T_3$ when connected in a standard substation circuit with loops of different length.

Suppose now it is desired to obtain the transmission curve of a transmitter T of a substation circuit Z, said transmitter T being of greater efficiency than the transmitter $T_3$. The substation X may now be disconnected and the substation Z connected to the transformer 23 by means of the switch 22. The variable impedance element P should be so set that no impedance is in series with the substation and the impedance of the substation Z should be equal to that of the substation X. If the transmitter T be now actuated by a sound as before, the observer at station Y may add a sufficient number of units to the artificial cable N so that the same sound is heard in the receiver $R_4$ as under the zero loop condition when the transmitter $T_3$ was tested. The number of units added to the artificial cable N now represents the number of transmission units of gain produced by the transmitter T under the zero loop condition. Assuming that the gain is equal to five units of the cable N, the first point of the curve B, which is a transmission curve of the transmitter T, is obtained. A similar series of tests is now made by adding successive units of the cable $N_1$ and noting the equivalent number of units of the standard cable N which must be eliminated. The curve B now results, and it will be noted that this curve represents a gain of substantially five transmission units over the curve A for all line resistances. The curve D represents the variation of the battery supply current with different lengths of line for both the transmitter T and the transmitter $T_3$, the units of current being plotted as ordinates.

If now it is desired to make the transmission with the transmitter T constant over a given range such that the transmission obtained over this range is equal to the zero loop condition of the transmitter $T_3$, the substation Z is again connected directly to the transformer 23 and a sufficient amount of resistance P is included in the circuit, so that with the original amount of artificial cable N in circuit the same sound is produced in the receiver $R_4$ as with the transmitter $T_3$ under the zero loop condition. Without varying the artificial cable N successive units of the cable $N_1$ are connected in circuit and the resistance P reduced, so that the same sound is heard in the receiver R, and this is continued until the resistance P is reduced to zero. The curve F may now be plotted to indicate the number of units of resistance necessary to maintain the transmission constant with different lengths of the cable $N_1$. In obtaining this curve resistance units are plotted as ordinates. The heavy line curve C is now a straight line from zero up to the point of its intersection with the curve B, indicating that the transmission obtained up to this point is equal to the transmission obtained with the transmitter $T_3$ under the zero loop condition. From this point the curve C will be the same as the curve B as there is nothing to compensate for further increase in the loop resistance. The heavy dotted line curve E represents a corresponding battery supply curve, said curve being uniform over the same range as the transmission is uniform.

From the curves shown in Fig. 13 it is apparent that transmission may be equalized over lines up to almost three units of loop resistance and a transmission still be obtained equal to the best transmission obtainable with the standard transmitter $T_3$. If it is desired to equalize the transmission over a greater range, the initial impedance P for the zero loop condition may be increased, thereby decreasing the transmitting efficiency over the equalized range thus bringing the curve C up from zero a certain number of transmission units. The curve C may then again be continued in a horizontal direction as the series impedance decreases, until the curve C crosses the curve B.

Figure 14:
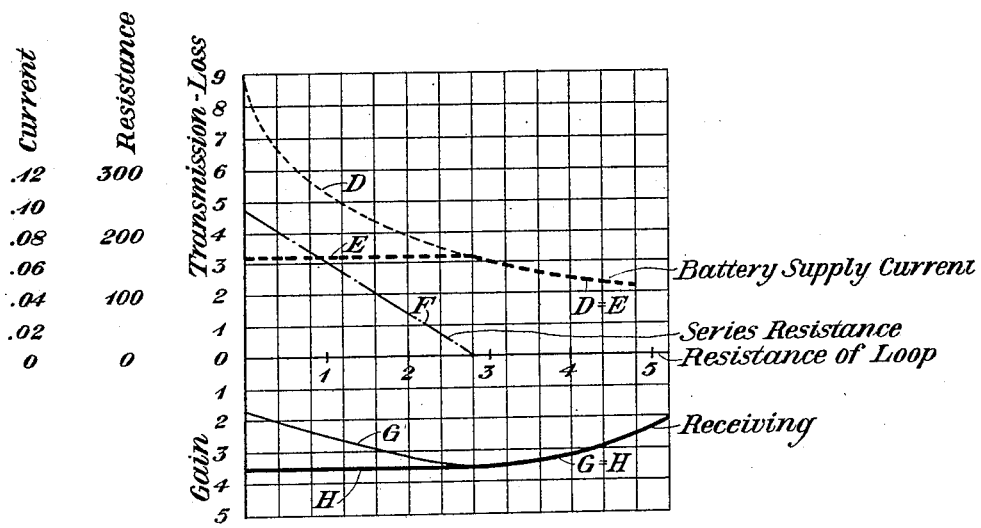

Fig. 14 represents the receiving efficiency obtained by the use of an electromagnetic receiver of a well known type. The curve D as before represents the variation of battery supply current with different line resistances. A test is first made with the substations X and Y connected to the transformers 23 and 24 by zero loops, the transformers being connected through a suitable number of units of standard artificial cable N. The transmitter $T_4$ may be actuated by a sound and the corresponding sound made in the standard receiver $R_3$ noted. This may now be considered a measure of the receiving efficiency with the receiver $R_3$ on zero loop. If now the substation X be disconnected and the substation Z including the electromagnetic receiver R be substituted, the impedance P being eliminated, the transmitter $T_4$ may again be actuated and a sufficient number of units of the standard cable N be added to the circuit to produce the same volume of sound in the receiver R as obtained before with receiver $R_3$. The number of units of standard cable N added in order to produce this result, represents the gain in transmission due to the superior efficiency of the receiver R as compared with receiver $R_3$ under the zero loop condition. This gives the first point of the curve G which it will be noted represents a gain of about 1.6 units. Similar tests may be made, successively including additional units of the cable $N_1$. By plotting the variations in the receiving efficiency with respect to variations in the line resistance, we obtain the curve G. Comparing this curve with the curve D which represents the battery supply current, it will be seen that the receiving efficiency is greatest when the battery supply current is a little over .06, corresponding to a loop of about 2.8 units, and that the receiving efficiency is reduced when the length of circuit is greater or less than this value of 2.8 units. If then the battery supply current be maintained constant at this value, the receiving efficiency will be constant. Accordingly with the substation Z connected directly to the transformer 23 and the same amount of artificial cable connected as in the initial test, the impedance element P may be adjusted so as to include sufficient impedance in the circuit to bring the battery supply current to the desired value. As units of the cable $N_1$ are connected in circuit, the impedance P may be decreased as shown by the curve F and the battery supply current will remain constant as shown by the curve E. By observing the sound in the receiver R it will be noted that the volume of sound obtained is constant and equal to a gain of about three and one-half units of the standard cable. This condition obtains until a loop of 2.8 units is reached when the compensating resistance is reduced to zero and from this point on the battery supply current falls off as shown by the curve E and the receiving efficiency decreases as shown by the curve H. Comparing curve H of Fig. 14 and curve C of Fig. 13 it will be seen that both the transmitting efficiency and receiving efficiency are constant with loops up to about 2.8 units, and over this range the transmission efficiency of lines of different lengths will be the same. It will in general be possible to increase the range over which the transmission is equalized, by inserting a greater resistance for the zero loop condition and accordingly reducing the resistance with increasing length of line. This will of course lower the horizontal part of the curve E, thereby elevating the horizontal portions of the curves C and H, so that the resultant transmission will be less, but the horizontal portions of the curve will be longer before intersecting with the curves B and G respectively.

The method above described for obtaining the curves of Figs. 13 and 14 are sufficiently accurate for practical conditions where a simple resistance element is employed for equalizing the lines. Where greater refinement is necessary and it is desired to equalize the lines as to all their electrical characteristics, the more complicated compensating net-works thereby necessitated may be determined by well known methods.

Figure 15:
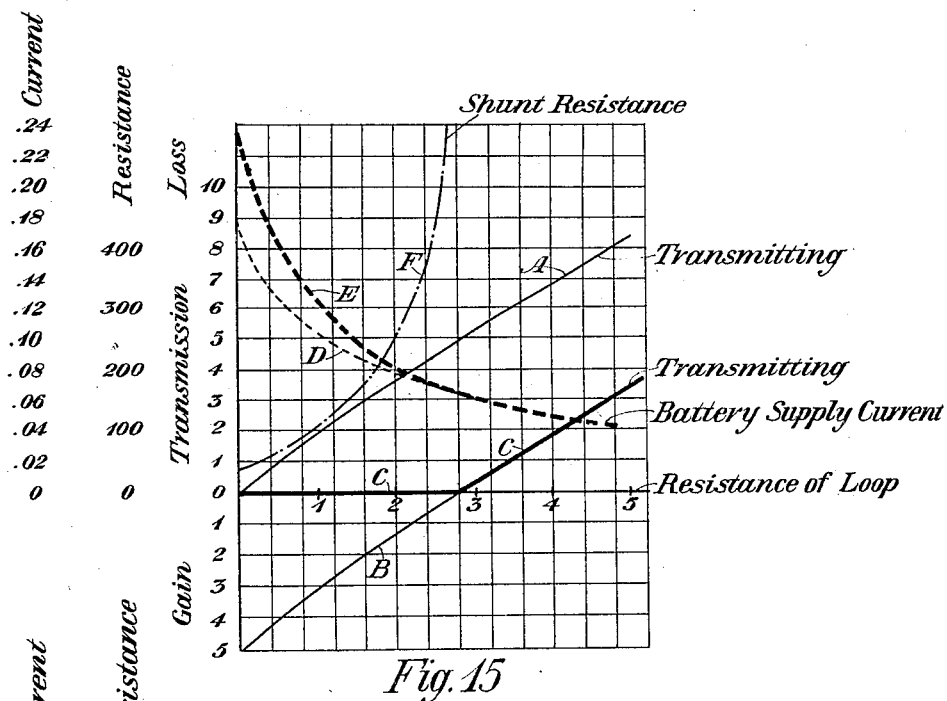
Figure 16:
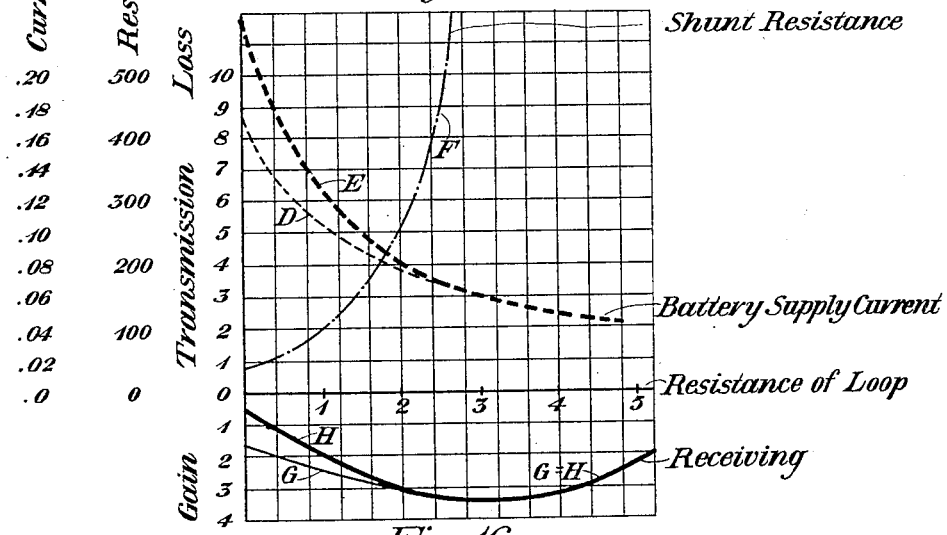

Fig. 15 shows the curve for the transmitter T when shunted by a compensating impedance element as shown in Fig. 5, Fig. 16 showing the corresponding curves for the receiver R of said figure, the receiver R being an electromagnetic receiver such as that used in obtaining the curve of Fig. 14 and the transmitter T being a transmitter of increased efficiency such as that used in obtaining the curve of Fig. 13.

In Fig. 15 the curves A, B and D correspond to the same curves in Fig. 13. The curve F indicates the value of shunt impedance necessary to maintain the transmitting efficiency constant so as to obtain a horizontal curve C for all loop resistances from zero up to about 2.8 units. The heavy dotted line curve E is the battery supply current curve obtained when the transmitter is shunted by an impedance element. A comparison of curves D and E indicates that in general a greater current flows over the line when the transmitter is shunted by a low impedance than is the case when the transmitter is unshunted, the two curves approaching each other as the shunt resistance is increased. When a loop resistance of about 2.8 units is reached, the two curves merge, since from this point on no compensating element is provided.

Referring to Fig. 16 which shows the receiving curves, the curves D, E and F are the same as the corresponding curves of Fig. 15, and the curve G corresponds to the same curve of Fig. 14. The curve H may be obtained by tests similar to those described in connection with the curves of Figs. 13 and 14, said curve representing the efficiency with the receiver R of the circuit in Fig. 5 under the same condition of battery supply and shunt resistance as in Fig. 15. It will be noted that under the zero loop condition the receiving efficiency is less when the transmitter is shunted than under the condition when no shunt is used. This of course follows from the fact that the shunt reduces the total resistance of the substation, thereby increasing the battery supply current flowing over the line and through the receiver as indicated by the curve E. Since the receiving efficiency is greater with the current supply obtained over a loop of about 2.8 units, the curve H will in general be higher than the curve G until a line resistance of 2.8 units is reached, when the two curves merge and continue as before. A comparison of the curves C and H of Figs. 15 and 16 respectively, shows that over the compensated range the transmitting efficiency remains constant while the receiving efficiency increases with increase in the length of loop.

Figure 17:
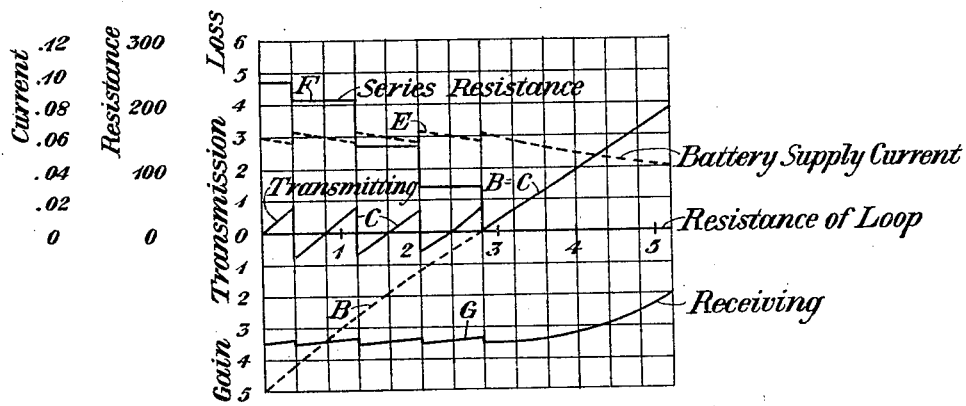

In the curves heretofore discussed, it has been assumed that the values of the series or shunt impedances, as the case may be, vary directly with the line resistance. In practice, however, this condition would not obtain but definite impedance elements would be provided for lines approximating certain definite lengths. Consequently the variation of the impedance element with the line resistance would not be uniform, but would be by definite steps. This condition is indicated by the curves of Fig. 17 in which F indicates the variation of the series resistance with the line resistance, E the corresponding current supply curve, C the transmitting curve and G the receiving curve. It will be noted that the curves C and G as well as the battery supply curve E, are not straight lines as in Figs. 13 to 16 inclusive, but are jagged or irregular. The results shown by the curves, however, constitute a sufficient approximation of the desired condition to satisfy practical requirements.

Figure 18:
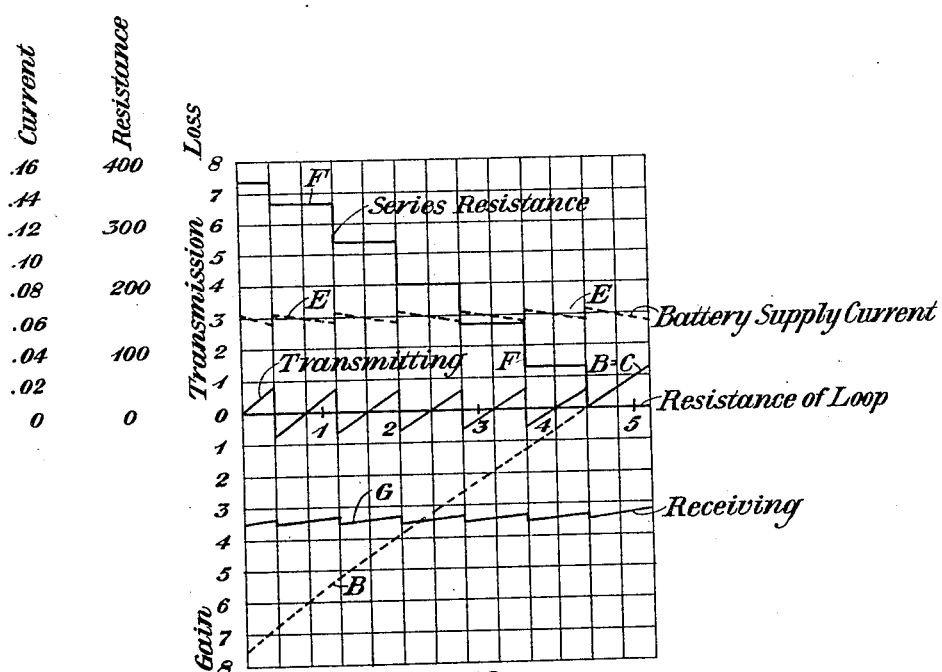

The curves of Fig. 18 indicate how it is possible to increase the range over which equalization takes place by increasing the potential of the source of current supply, at the same time increasing the compensating impedance so that the actual current supply remains the same as before. In Fig. 17, under the zero loop condition, a series impedance of about 235 units was employed in order to obtain the desired battery supply current. In Fig. 18 the series impedance employed under the zero loop condition is about 370 units. The potential of the battery is then increased by an amount sufficient to bring the battery supply current up to the same initial value as that obtained in Fig. 17. By this means the equalization of the transmission may be extended to a line having a resistance of about 4.4 units before the compensating impedance becomes zero.

From the curves above given by way of illustration it will be apparent how the impedance elements of the various circuit arrangements discussed may be proportioned in order to equalize the transmission over any desired range. Furthermore, it will be apparent that by the provision of transmitters or receivers of increased efficiency, or by increase of the battery potential or by other well known means it is possible to bring the transmission to any desired value over the compensated range.

By means of the invention hereinbefore disclosed the service is improved by providing uniform transmission of better grade than the average heretofore obtainable at the same time reducing crosstalk troubles and operating the transmitter and receiver under uniform conditions. In addition to the improvement in service obtained, large economies result due to the saving in battery supply current and the decrease in maintenance expense. Furthermore, since toll lines and trunk lines must be designed so that proper transmission is obtainable over such lines when connected to subscribers' lines of the lowest efficiency, great economies may now be secured in the design of trunk and toll lines, since they may be designed with reference to transmission conditions obtaining when connected to uniform subscribers' circuits of greater efficiency than the low grade circuits which had to be considered heretofore.

It will of course be understood that while in this specification it has been convenient to consider the properties of different lines in terms of the length or resistance of the line, these terms are all to be construed in the broadest sense, it being evident that other factors than length and resistance may be taken into consideration in equalizing the lines. It will also be obvious that the general principles herein disclosed may be embodied in many other organizations widely differing from those illustrated and described, without departing from the spirit of the invention as defined in the following claims.

What is claimed is:

1. In a telephone system, a central station, a plurality of outlying stations, lines extending from the central station to each outlying station, each line having electrical characteristics which differ with respect to direct currents and telephone currents, said characteristics being different for different lines, a substation set at each outlying station including a transmitter and a receiver, a common source of current supply for said sets at said central station, and means to determine that the direct currents supplied to said lines will be substantially the same and the voice currents impressed on the receivers will be substantially equal.

2. In a telephone system, a central station, a plurality of outlying stations, lines extending from said central station to each outlying station, each line having a different resistance for direct currents and for telephone currents and the resistances of different lines differing from each other, a substation set including a telephone at each outlying station, and an impedance element for equalizing the transmission of voice currents delivered to said telephone, the impedance of said element being predetermined in accordance with the resistance of the line so that the transmission between any two outlying stations interconnected through said central station will be uniform.

3. In a telephone system, a central station, a plurality of outlying stations, lines extending from said central station to each of said outlying stations, each of said lines having electrical characteristics which are different for direct currents and for telephone currents and the electrical characteristics of the various lines differing from each other, a substation set including a transmitter on each line at the outlying station, and an impedance element for equalizing the transmission of energy generated by said transmitter, the impedance of said element being predetermined in accordance with the electrical characteristics of the line so that the transmission between substation sets of any pair of lines interconnected through said central station will be uniform.

4. In a telephone system, a central station, a plurality of outlying stations, lines of differing lengths extending from said central station to each of said outlying stations, a substation set including a transmitter and a receiver on each line at the outlying station, a common source of current supply for said transmitters at the central station and means to equalize the transmission of energy to the receivers over the different lines, said means also preventing an excessive current from flowing through the transmitters on relatively short lines.

5. In a telephone system, a central station, a plurality of outlying stations, lines extending to said outlying stations, each line having resistances which are different with respect to direct currents and telephone currents, and the resistances of the various lines differing from each other, substation sets for each line at the outlying stations and means having electrical values predetermined in accordance with said resistances to equalize the transmission of voice currents over any pair of lines interconnected through said central station.

6. In a telephone system, a central station, a plurality of outlying stations, lines extending from said central station to each of said outlying stations, said lines having resistances which differ with respect to direct currents and telephone currents and the resistances of the various lines differing from each other, substation sets for said lines at said outlying stations, a common source of current supply for said lines at said central station, and means to equalize the voice currents received by said substation sets regardless of the resistances of the lines.

7. In a telephone system, a central station, a plurality of outlying stations, lines extending from said central station to each of said outlying stations, said lines having electrical characteristics which differ with respect to direct currents and telephone currents, said electrical characteristics of the various lines differing from each other, substation sets for each line at said outlying stations and fixed impedance elements for said lines so proportioned with respect to the electrical characteristics of the lines and so related thereto that the line current flowing through said substations will be substantially the same for any pair of lines interconnected through said central station.

8. In a telephone system, a central station, a plurality of outlying stations, lines extending from said central station to each of said outlying stations, said lines having electrical characteristics which differ with respect to direct currents and alternating currents and said electrical characteristics of the various lines differing from each other, substation sets for each line at each outlying station, each substation set including a telephone instrument, a fixed impedance element so proportioned with respect to the electrical characteristics of the lines and so related thereto that the line current flowing through said telephone instruments will be substantially the same for any pair of lines interconnected through said central station.

9. In a telephone system, a central station a plurality of outlying stations, lines extending from said central station to each of said outlying stations, each of said lines having electrical characteristics which differ with respect to direct currents and telephone currents and the electrical characteristics of the various lines differing from each other, substation sets for said lines at each outlying station and fixed impedance elements serially included in the lines and so proportioned with reference to the electrical characteristics thereof that the line current flowing through different substations will be substantially the same for any pair of lines interconnected through said central station.

10. In a telephone system, a central station, a plurality of outlying stations, lines extending from said central station to each of said outlying stations, said lines each having resistances which differ with respect to direct currents and telephone currents and the resistances of the various lines differing from each other, substation sets for each line at said outlying stations and fixed impedance elements serially included in the lines at the substations and so proportioned with reference to the resistances thereof that the line current flowing through different substations will be substantially the same for any pair of lines interconnected through said central station.

11. In a telephone system, a central station, a plurality of outlying stations, lines extending from said central station to each of said outlying stations, each line having electrical characteristics which differ with respect to direct currents and telephone currents and the electrical characteristics of the various lines differing from each other, substation apparatus for each line including a transmitter and receiver at the outlying station, and means for equalizing the energy transmitted from a transmitter over any pair of lines interconnected through said central station and for equalizing the energy received over any pair of said lines by the receivers.

12. In a telephone system, a central station, a plurality of outlying stations, telephones at said outlying stations, lines of differing lengths extending from said central station to each of said outlying stations, a common source of battery supply current at said central station for energizing said telephones, and means to prevent a greater transmission of voice currents over short lines than over long lines.

13. In a telephone system, a central station, a plurality of outlying stations, lines extending from said central station to each of said outlying stations, each line having electrical characteristics which differ with regard to direct currents and telephone currents and the electrical characteristics of the various lines differing from each other, a substation set including a transmitter and a receiver on each subscriber's line at the outlying stations, and means for so controlling the generation of voice currents by the transmitter of any line and the transmission thereof that substantially the same energy will be received by the receiver of any other line to which it is interconnected through said central station.

14. In a telephone system, a central station, a plurality of outlying stations, lines extending from said central station to each outlying station, each of said lines having electrical characteristics which differ with respect to direct currents and alternating currents and the electrical characteristics of the various lines differing from each other, a substation set including a transmitter and a receiver on each line at the outlying station, and fixed impedance elements so proportioned and constructed with reference to the electrical characteristics of the individual lines that substantially the same amount of energy will be transmitted from the transmitter of one line to the receiver of any other line with which it is connected through said central station.

15. In a telephone system, a central station, a plurality of outlying stations, lines extending from said central station to each of said outlying stations, each of said lines having resistances which differ with respect to direct currents and telephone currents and the resistances of the various lines differing from each other, a subscriber's set including a transmitter and a receiver on each line at the outlying station thereof, and means having electrical values predetermined in accordance with said resistances for rendering the transmission of telephone currents uniform over any pair of lines interconnected through said central station.

16. In a telephone system, a central station, a plurality of outlying stations, lines extending from said central station to each of said outlying stations, each of said lines having electrical characteristics which differ with respect to direct currents and telephone currents and the electrical characteristics of the various lines differing from each other, and means predetermined in accordance with said characteristics for rendering said electrical characteristics uniform both as to direct current supply and voice currents.

17. In a telephone system, a central station, a plurality of outlying stations, lines extending from said central station to each of said outlying stations, each of said lines having resistances which differ with respect to direct currents and telephone currents, and the resistances of the various lines differing from each other, a subscriber's set on each line at the outlying station thereof including a transmitter and receiver, a common source of current for said lines and sets at said central office, and a serially connected impedance so proportioned as to render both the direct current supply and the transmission of voice currents over said lines uniform.

18. In a telephone system, a central station, a plurality of outlying stations, lines extending from said central station to each of said outlying stations, each of said lines having electrical characteristics differing with respect to the transmission of direct currents and voice currents and the electrical characteristics of the various lines differing from each other, and means adapted to be included in said lines for producing such uniformity in said electrical characteristics that the transmission of line currents from end to end over any pair of lines interconnected through said central station will be uniform.

19. In a telephone system, a central station, a plurality of outlying stations, lines extending from said central station to each of said outlying stations, each of said lines having electrical characteristics which differ with respect to direct currents and telephone currents and the electrical characteristics of the various lines differing from each other, and means to produce uniform transmission of telephone currents from any outlying station to any other outlying station interconnected therewith through said central station.

20. In a telephone system, a central station, a plurality of outlying stations, lines extending from said central station to each of said outlying stations, said lines having electrical characteristics which differ with respect to direct currents and alternating currents and the electrical characteristics of the various lines differing from each other, a common source of direct current supply for said lines and said central station, and means for equalizing the supply of said currents to any pair of outlying stations interconnected through said central station and for producing uniform transmission of voice currents between any such pair of said stations.

In testimony whereof I have signed my name to this specification this 24th day of December, 1917.

BANCROFT GHERARDI.